(12) United States Patent  (10) Patent No.: US 8,510,824 B2
Yang et al.  (45) Date of Patent: Aug. 13, 2013

(54) METHOD, SYSTEM, SUBSCRIBER EQUIPMENT AND MULTI-MEDIA SERVER FOR DIGITAL COPYRIGHT PROTECTION

(75) Inventors: Jian Yang, Shenzhen (CN); Qin Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 633 days.

(21) Appl. No.: 12/239,864

(22) Filed: Sep. 29, 2008

(65) Prior Publication Data

US 2009/0041242 A1  Feb. 12, 2009

Related U.S. Application Data

(63) Continuation of application No. PCT/CN2007/001000, filed on Mar. 28, 2007.

(30) Foreign Application Priority Data

Mar. 29, 2006  (CN) .......................... 2006 1 0034794

(51) Int. Cl.
*H04L 29/06* (2006.01)
*H04L 9/28* (2006.01)
*G06F 15/16* (2006.01)

(52) U.S. Cl.
USPC .................. 726/14; 713/168; 726/27; 705/51

(58) Field of Classification Search
None
See application file for complete search history.

(56) References Cited

U.S. PATENT DOCUMENTS

| | | | |
|---|---|---|---|
| 6,970,849 B1 | 11/2005 | DeMello et al. | |
| 6,996,720 B1 | 2/2006 | DeMello et al. | |
| 7,047,411 B1 | 5/2006 | DeMello et al. | |
| 7,251,832 B2* | 7/2007 | Venters et al. | 726/26 |
| 7,343,012 B2* | 3/2008 | Kudo et al. | 380/201 |
| 7,356,687 B2* | 4/2008 | Medvinsky et al. | 713/151 |
| 7,436,955 B2* | 10/2008 | Yan et al. | 380/37 |
| 7,490,341 B2* | 2/2009 | Kiiskinen et al. | 725/38 |
| 7,620,185 B2* | 11/2009 | Lahtinen et al. | 380/277 |
| 7,706,534 B2* | 4/2010 | Saarikivi | 380/233 |
| 7,818,792 B2* | 10/2010 | Shamsaasef et al. | 726/10 |
| 7,987,502 B2* | 7/2011 | Venters et al. | 726/9 |
| 2003/0046238 A1* | 3/2003 | Nonaka et al. | 705/51 |
| 2003/0065917 A1* | 4/2003 | Medvinsky et al. | 713/160 |

(Continued)

FOREIGN PATENT DOCUMENTS

CN  1859414 A  11/2006
JP  2001109696 A  4/2001

(Continued)

OTHER PUBLICATIONS

Kent et al, "Security Architecture for the Internet Protocol", Nov. 1998, Network Request for Comments; 2401; p. 1-66.*

(Continued)

*Primary Examiner* — Christopher Revak
(74) *Attorney, Agent, or Firm* — Slater & Matsil, L.L.P.

(57) ABSTRACT

A method for digital copyright protection includes stream media server negotiation with a copyright center to generate copyright object RO, RO carrying copyright service regulations and establishing encrypted communication channel information; subscriber equipment receiving RO, through the establishing encrypted communication channel information carried by RO to establish encrypted communication channel with stream media server; and stream media server transmitting media stream to subscriber equipment. The present disclosure also discloses a DRM system, subscriber equipment and multi-media server.

18 Claims, 5 Drawing Sheets

(56) References Cited

U.S. PATENT DOCUMENTS

| | | | | |
|---|---|---|---|---|
| 2004/0181667 | A1* | 9/2004 | Venters et al. | 713/164 |
| 2004/0205332 | A1* | 10/2004 | Bouchard et al. | 713/153 |
| 2005/0090235 | A1 | 4/2005 | Vermola et al. | |
| 2005/0091491 | A1 | 4/2005 | Lee et al. | |
| 2005/0108556 | A1 | 5/2005 | DeMello et al. | |
| 2005/0172127 | A1 | 8/2005 | Hartung et al. | |
| 2005/0188228 | A1 | 8/2005 | DeMello et al. | |
| 2005/0210249 | A1 | 9/2005 | Lee et al. | |
| 2005/0213574 | A1 | 9/2005 | Yoshimura et al. | |
| 2005/0216739 | A1 | 9/2005 | Lee et al. | |
| 2005/0265555 | A1 | 12/2005 | Pippuri | |
| 2005/0278259 | A1 | 12/2005 | Gunaseelan et al. | |
| 2006/0034321 | A1* | 2/2006 | Paila et al. | 370/464 |
| 2006/0059090 | A1* | 3/2006 | Lahtinen et al. | 705/50 |
| 2006/0059094 | A1 | 3/2006 | Oh et al. | |
| 2006/0143702 | A1* | 6/2006 | Hisada et al. | 726/15 |
| 2006/0230446 | A1* | 10/2006 | Vu | 726/15 |
| 2006/0277598 | A1 | 12/2006 | Ahn | |
| 2007/0256140 | A1* | 11/2007 | Venters et al. | 726/26 |
| 2007/0283167 | A1* | 12/2007 | Venters et al. | 713/189 |
| 2009/0010223 | A1* | 1/2009 | Hirano | 370/331 |
| 2009/0041242 | A1 | 2/2009 | Yang et al. | |
| 2010/0241753 | A1* | 9/2010 | Garbajs et al. | 709/227 |

FOREIGN PATENT DOCUMENTS

| | | |
|---|---|---|
| JP | 2005167608 A | 6/2005 |
| WO | WO-0127709 | 4/2001 |
| WO | WO-0144908 | 6/2001 |
| WO | WO-2005031593 | 4/2005 |
| WO | WO-2005107259 A1 | 11/2005 |
| WO | WO-2005109146 | 11/2005 |
| WO | WO-2006016778 | 2/2006 |

OTHER PUBLICATIONS

Supplementary European Search Report dated Jun. 15, 2009 regarding Application No. EP 07720574.

European Office Action dated Nov. 11, 2009 regarding Application No. 07 720574.8.

"IPsec" Internet Citation, Mar. 25, 2006, p. 5pp, XP009115737.

OMA: DRM Specification Approved Version 2.0—Mar. 3, 2006.

International Search Report for International Application No. PCT/CN2007/001000, dated Jun. 16, 2007, with English translation.

Korean Office Action regarding Application No. 10-2008-7025065, dated Aug. 30, 2010. Translation provided by Huawei Technologies Co., Ltd.

Korean Final Office Action regarding Application No. 10-2008-7025065, dated Jan. 31, 2011. Translation provided by Huawei Technologies Co., Ltd.

Office Action issued by Japan Patent Office regarding application No. 2009-501821, mailed on Aug. 30, 2011.

"Message from Venders: Method for Implementing VPN Construction in a Mixed Environment of Different Machines Using IPSec (Prior Article)." Joint Stock Company DIT. Software Design, Japan. Gijutsu-Hyohron Co., Ltd. Jul. 18, 2000. vol. 117, pp. 200-203.

"DRM Standardization Trend of OMA—Technologies for Realizing digital contents distribution and digital rights management." NTT DoCoMo Technical Journal, Japan. The Telecommunications Association. Jan. 1, 2005. vol. 12, No. 4, pp. 52-59.

Larry J. Hughes, Jr. *Actually Useful Internet Security Techniques*. Chapter 4: The Kerberos Authentication System. pp. 94-102. Japan. Impress, Inc. Feb. 21, 1997.

Japanese Decision on Final Rejection regarding Application No. 2009-501821, mailed Mar. 27, 2012. Translation provided by Huawei Technologies Co., Ltd.

Written Inquiry received in Japanese Application No. 2009/501821, mailed Jan. 29, 2013, pp. 1-5.

C. Kaufman, Ed., "Internet Key Exchange (IKEv2) Protocol," Network Working Group Request for Comments: 4306, [online], Dec. 2005, http://www.ipa.go.jp/security/rfc/RFC4306EN.html, 90 pages.

Kanda, Mitsuru et al., "Development of IPsec Key-exchange Architecture racoon2," [online] received Jan. 27, 2004, http://member.wide.ad.jp/draft/wide-draft-ipsec-report2004-01.pdf, 9 pages.

Summons to Attend Oral Proceedings Pursuant to Rule 115(1) EPC regarding European Application No. 07720574.8-2212/2006787, dated Mar. 27, 2012.

\* cited by examiner

METHOD, SYSTEM, SUBSCRIBER EQUIPMENT AND MULTI-MEDIA SERVER FOR DIGITAL COPYRIGHT PROTECTION

CROSS-REFERENCE TO RELATED APPLICATIONS

This application is a continuation of International Application No. PCT/CN2007/001000, filed Mar. 28, 2007. This application claims the benefit and priority of Chinese Application No. 200610034794.9, filed Mar. 29, 2006. The entire disclosures of each of the above applications are incorporated herein by reference.

FIELD

The present disclosure relates to a digital copyright protection method and system, a User Equipment and a multimedia server.

BACKGROUND

This section provides background information related to the present disclosure which is not necessarily prior art.

In near years, applications of a stream media technology based on a broadband wired network have been developed greatly; furthermore, a stream media technology based on a mobile communication network has been getting matured.

The stream media are such media that may be transmitted in a streaming transmission manner over a network. It is not necessary to download an entire file before the stream media is played, instead, only content of the beginning part of the file is stored into a memory, and data packets are buffered in a User Equipment and media data is outputted correctly. With the streaming transmission manner, a user may enjoy a media file after a start delay of only several or tens of seconds, before the entire media file is downloaded completely. The rest of the file is downloaded subsequently from the server in the background, so that the user may enjoy the file while receiving it.

Copyright is an important aspect to be considered with respect to the transmission of stream media. The Digital Right Management (DRM) is a technology for preventing digital media (such as a game, a ring tone, an image, an audio and a video) from being duplicated illegally or used illegally, and has been deployed commonly in a wired network.

At present, a lot of researches have been carried out on mobile DRM in the world. A mobile DRM standard established by the Open Mobile Alliance (OMA) has been supported and accepted widely. The OMA issued the latest OMA DRM V2.0 on Jun. 14, 2005, which establishes a security-trust model based on Public Key Infrastructure (PKI), architecture of the mobile DRM, a rights description language standard, DRM Content Format (DCF) and Rights Object Acquisition Protocol (ROAP).

An OMA DRM system includes a DRM Agent of a User Equipment, a Content Issuer (CI), a Rights Issue (RI) and the like. In a solution of digital copyright of stream media by the OMA, the stream media are stored in a stream media server. A media stream is encrypted, and a decryption key is arranged in a Right Object (RO), as shown in FIG. 1, the RO includes a copyright use rule 110 and a media stream decryption key (for example, Content Encryption Key (CEK)) 120. After the RO is obtained by the DRM Agent of the User Equipment, the media stream may be decrypted with the decryption key in the RO for enjoying, while the media stream is being downloaded. A particular interaction procedure is shown in FIG. 2, including:

At 11: A User Equipment connects to a web page of a CI, finds interested stream media and requests for downloading the stream media;

At 12: The Content Issuer generates address information Token of the stream media;

At 13A and 13B: The CI sends the Token to the User Equipment and an RI respectively;

At 14: A stream media server and the Rights Issue negotiate to generate an RO;

At 15: The User Equipment requests the RO from the Rights Issuer, with the Token being carried in the request;

At 16: The RI sends the RO to the User Equipment;

At 17: After a session is established between the User Equipment and the stream media server, the stream media server transmits to the User Equipment the DRM protected media stream that is encrypted with the CEK.

After obtaining the DRM protected media stream, the User Equipment decrypts the media stream with the CEK in the RO and plays the media file.

In the prior art, the decryption of a media stream is performed at the Application Layer of the User Equipment. In this case, a strict requirement is raised for the User Equipment, resulting in an increase on additional cost of the User Equipment.

In addition, in implementing a multimedia service such as mobile TV and file downloading, the digital copyright protection method and system in the prior art have a high requirement for the User Equipment, resulting in an increase on additional cost of the User Equipment.

Authentication and encryption services are provided in the Internet Protocol Security (IPSec) by using strong cryptography. The authentication ensures that data is from the intended sender and is not modified during transmission, and the encryption may prevent a data packet from being read without authorization. These services allow a secure channel to be established in an untrusty network. The IPSec provides the encryption and authentication services at the Internet Protocol (IP) layer of the network protocol stack. The IPSec operates at the IP layer and may protect any communication carried over IP.

SUMMARY

This section provides a general summary of the disclosure, and is not a comprehensive disclosure of its full scope or all of its features.

Various embodiments of the disclosure provide a digital copyright protection method and system, and a multimedia server, so as to reduce the cost of a User Equipment.

According to an embodiment, a User Equipment is provided, which may implement digital copyright protection with a lower cost.

A stream media digital copyright protection method provided in an embodiment includes: negotiating between a stream media server and a Rights Issuer to generate a Right Object carrying information for establishing an encrypted communication channel; establishing, by a User Equipment, the encrypted communication channel to the stream media server using the information for establishing the encrypted communication channel carried in the Right Object, upon receiving the Right Object; and sending, by the stream media server, a media stream to the User Equipment via the encrypted communication channel.

A stream media digital copyright protection method provided in another embodiment includes: negotiating between a multimedia server and a Rights Issuer to generate a Right Object carrying information for establishing an encrypted communication channel; establishing, by a User Equipment, the encrypted communication channel to the multimedia server using the information for establishing the encrypted communication channel carried in the Rights Object, upon receipt of the Rights Object; and sending, by the multimedia server, media data to the User Equipment via the encrypted communication channel.

A digital copyright protection system is provided in a further embodiment, and the system includes a multimedia server and a Rights Issuer.

The multimedia server is adapted to store media data; negotiate with the Rights Issuer to generate a Right Object carrying information for establishing an encrypted communication channel; negotiate with a User Equipment using the information to establish the encrypted communication channel; and send media data under copyright protection to the User Equipment via the encrypted communication channel; and The Rights Issuer is adapted to negotiate with the multimedia server to generate the Right Object carrying information for establishing the encrypted communication channel, and send the Right Object to the User Equipment.

A digital copyright protection system is provided in a further embodiment, and the system includes a multimedia server, a Right Issuer and a Content Issuer.

The multimedia server is adapted to store media data; negotiate with the Rights Issuer to generate a Right Object carrying information for establishing an encrypted communication channel; negotiate with a User Equipment using the information to establish the encrypted communication channel; and send media data under copyright protection to the User Equipment via the encrypted communication channel.

The Rights Issuer is adapted to negotiate with the multimedia server to generate the Right Object carrying the information for establishing the encrypted communication channel.

The Content Issuer is adapted to provide media information for the User Equipment; instruct the multimedia server and the Rights Issuer to negotiate to generate the Right Object, when the User Equipment requests for downloading the media data; and send the RO to the User Equipment.

A multimedia server is provided in another embodiment, including: a media data storage unit adapted to store media data; a Right Object negotiation unit adapted to negotiate with a Rights Issuer to generate a Right Object carrying information for establishing an encrypted communication channel; a channel negotiation unit adapted to negotiate with a User Equipment using the information to establish the encrypted communication channel; and a media data provision unit adapted to provide the media data under copyright protection to the User Equipment via the encrypted communication channel.

A User Equipment is provided in a further embodiment, including:

a browser adapted to browse media information provided by a Content Issuer, and request for downloading media data; a DRM Agent adapted to obtain information for establishing an encrypted communication channel carried in a received Right Object; and establish the encrypted communication channel with a multimedia server using the information; and a media processor adapted to process the media data transmitted via the encrypted communication channel.

In the various embodiments, by means of encrypting a logical path rather than the media data, the additional cost required for decrypting the media data at the client Application Layer may be avoided. Therefore requirements for performance of a User Equipment are lowered and user experience is improved. Furthermore, a dedicated logical path is established between the Client device and a multimedia server, so that a risk that the media data is intercepted and captured by a third party entity is reduced, and the security of end-to-end communications is improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Embodiments are further described as follows by reference to the drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
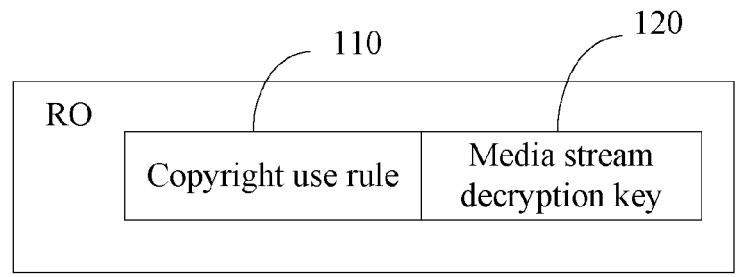
FIG. 1 is a schematic diagram illustrating configuration of an RO in the prior art.
Figure 2:
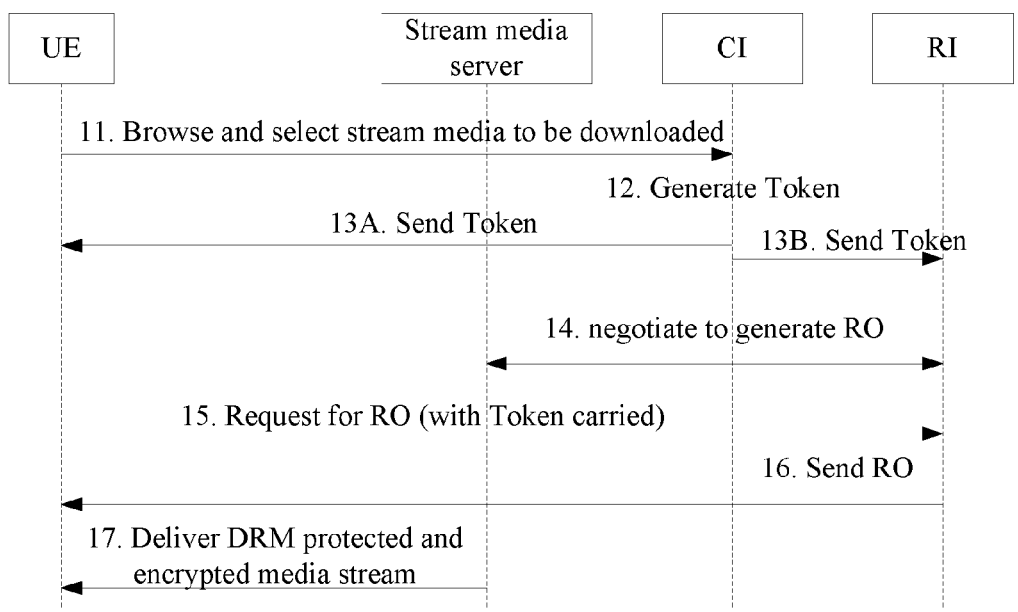
FIG. 2 is a schematic diagram illustrating the interaction procedure of stream media DRM in the prior art.
Figure 3:
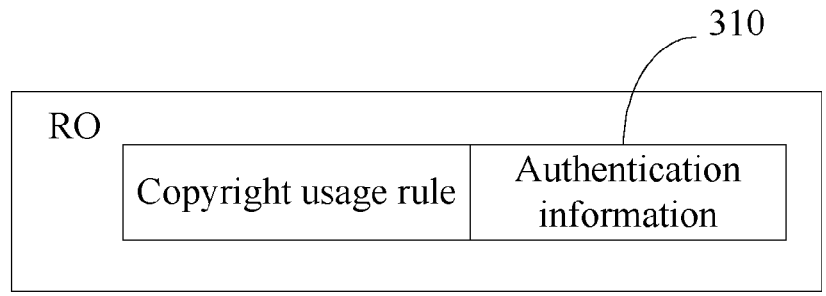
FIG. 3 is a schematic diagram illustrating configuration of an RO according to a first embodiment.

According to an embodiment, there is provided a solution of stream media Digital Right Management based on IPSec, in which a logical path between a stream media server and a User Equipment is encrypted; and authentication information 310 for establishing an IPSec communication channel between the User Equipment and the stream media server, rather than the key for the logical path, is stored in the RO, as shown in FIG. 3.

Figure 4:
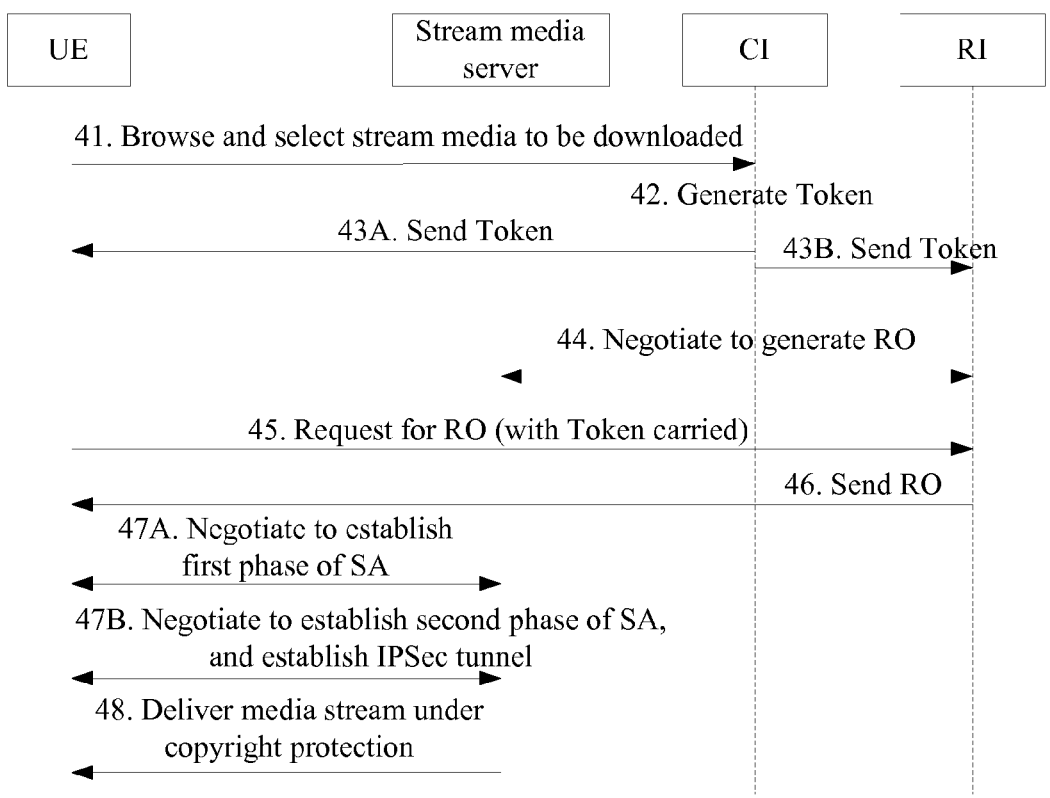
FIG. 4 is a schematic diagram illustrating interaction procedure of the stream media DRM method according to an embodiment.

A particular interaction procedure according to the embodiment is shown in FIG. 4, and the procedure includes:

At 41: A User Equipment connects to a web page of a Content Issuer, finds interested stream media and requests for downloading the interested stream media;

At 42: The Content Issuer generates a Token;

At 43A and 43B: The Content Issuer sends the Token to the User Equipment and a Rights Issuer;

At 44: A stream media server and the Rights Issuer negotiate to generate an RO;

At 44, the RO generated by the stream media server and the Rights Issuer through negotiation carries authentication information for establishing an IPSec communication channel between the User Equipment and the stream media server.

At 45: The User Equipment requests the RO from the Rights Issuer, with the Token being carried in the request;

At 46: The Rights Issuer sends the RO to the User Equipment;

At 47A: The User Equipment and the stream media server negotiate to establish a first phase of SA; and authenticate the communication channel to be established sequentially through negotiation; the authentication is performed by the User Equipment and the stream media server with the authentication information carried in the RO;

At 47B: The User Equipment and the stream media server negotiate to establish a second phase of SA, so that an IPSec communication channel is established; and At 48: The stream media server transmits the media stream to the User Equipment via the communication channel.

The User Equipment plays the media stream according to a copyright use rule in the RO.

At 44, in the generation of the RO, the stream media server and the Rights Issuer negotiate the authentication information for establishing the IPSec communication channel. In the establishment of the SA through negotiation at 47A, the authentication information is used when identity and verification data are delivered to each other. The procedure may proceed with the second phase of SA of IPSec only if the authentication at 47A is passed, so as to negotiate a key for encrypting an IP data packet.

The first phase of SA of IPSec typically includes processes:

A first process includes policy negotiation.

In the first process, four mandatory parameters are negotiated:

(1) encryption algorithm: Either DES or 3DES is selected;
(2) Hash algorithm: Either MD5 or SHA is selected;
(3) authentication method: Certificate authentication, preset shared key authentication or Kerberos v5 authentication is selected; and
(4) selection of Diffie-Hellman group.

A second process includes key exchange.

Despite the term of "key exchange", no actual key is exchanged between the User Equipment and the stream media server, but some basic material information required for generating a shared key is exchanged. The exchange may be public or under protection. The User Equipment and the stream media server may generate respectively the same shared master key after the materials for key generation is exchange with each other, so as to protect the following authentication procedure.

A third process includes authentication.

A communication entity and a communication channel are authenticated with the use of both the shared master key and the negotiation algorithm determined at the first process. At the third process, the confidentiality and integrity of all the entity payloads to be authenticated, including an entity type, a port number and a protocol, may be implemented with the shared master key generated at the second process.

Figure 5:
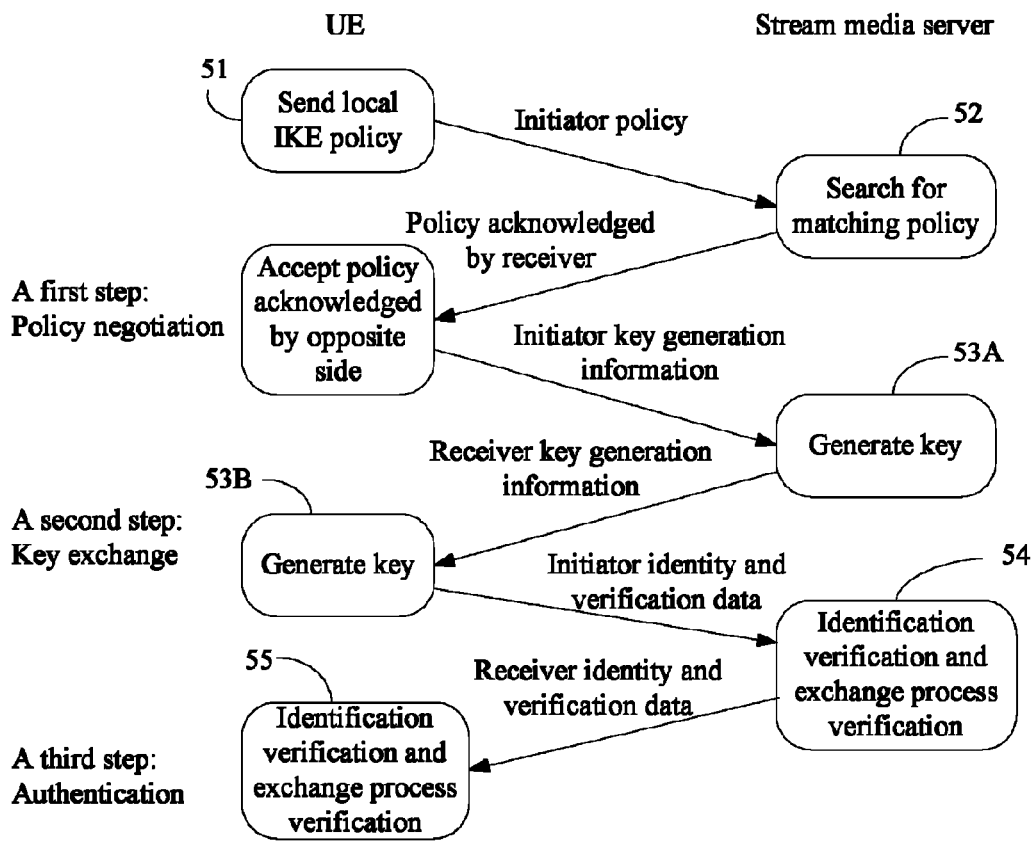
FIG. 5 is a diagram illustrating the procedure of a first phase of Security Association (SA) of IPSec as shown in FIG. 4.

According to the embodiment, at 47A, the particular procedure in which the User Equipment and the stream media server establishes the first phase of SA is shown in FIG. 5, and the procedure includes as follows.

At 51: A User Equipment sends a local Internet Key Exchange (IKE) policy to a stream media server;

At 52: The stream media server acknowledges the algorithm used by the User Equipment, searches for a local matching policy, and sends the policy acknowledged by the stream media server to the User Equipment;

At 53A and 53B: Upon receiving the acknowledged policy from the opposite side (i.e., the stream media server), the User Equipment delivers information for key generation; the stream media server and the User Equipment exchange the information for key generation and generate respectively a key;

At 54: The User Equipment delivers identity and verification data to the stream media server; with the authentication information carried in the RO being included in the identity and verification data; after verifying the identity of the User Equipment, the stream media server sends its identity and verification data to the User Equipment; and At 55: The first phase of SA is accomplished after the User Equipment and the stream media server complete the identity verification and the exchange procedure verification.

An alternative implementation of the method according to the embodiment may include as follows.

At 44, copyright use acknowledgment information for the User Equipment is carried in the RO generated by the stream media server and the Rights Issuer through negotiation; at 47, the User Equipment provides the copyright use acknowledge information carried in the RO to the stream media server when requesting for downloading contents from the stream media server, and the stream media server authenticates the copyright use acknowledge information; and if the authentication is passed, the stream media server and the User Equipment negotiate SA and establish an IPSec communication channel. The procedures of the SA negotiation and establishment of the IPSec communication may be implemented in the prior art, and thus will not be described further herein.

After the IPSec communication channel is established between the stream media server and the User Equipment, a media stream is transmitted from the stream media server to the User Equipment via the IPSec communication channel, and is played by the User Equipment according to the copyright use rule in the RO.

The IPSec communication channel established in the embodiment is in an IPSec tunneling mode. It will be appreciated that other modes, such as a transport mode, may also be employed.

Figure 6:
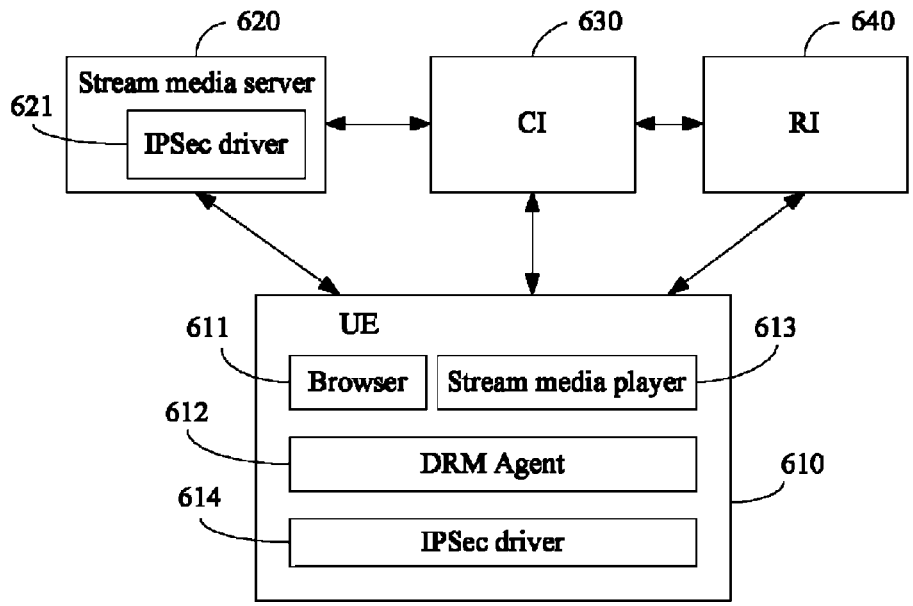
FIG. 6 is a schematic diagram of the DRM system according to an embodiment.

Furthermore, if the capability of the User Equipment permitting, the method according to the embodiment may be used in connection with the stream media DRM method in the prior art. In other words, both the contents of the stream media and the transmission channel for the stream media may be encrypted, and both the information for establishing the IPSec communication channel and the CEK are included in the RO. The User Equipment and the DRM system in the embodiment are shown in FIG. 6. The system includes a stream media server 620, a Content Issuer 630 and a Rights Issuer 640. The User Equipment 610 includes: a browser 611 for browsing stream media information provided by the Content Issuer 630 and requesting for downloading the stream media; a DRM Agent 612 for obtaining information for establishing an encrypted communication channel carried in a received RO, and establishing the encrypted communication channel with the stream media server 620 using the information; and a stream media player 613 for playing the media stream transmitted via the encrypted communication channel.

The stream media server 620 is adapted to store contents of stream media, negotiate with the Rights Issuer 640 to generate an RO carrying the information for establishing an encrypted communication channel, establish the encrypted communication channel through negotiation with the User Equipment 610 using the information, and provide the media stream under copyright protection to the User Equipment 610 via the encrypted communication channel.

The Content Issuer 630 is adapted to provide the User Equipment 610 with stream media information; and provide the User Equipment 610 with a Token and sending the Token to the Rights Issuer 640, when the User Equipment 610 requests for downloading stream media.

The Rights Issuer 640 is adapted to negotiate with the stream media server 620 to generate an RO carrying the information for establishing an encrypted communication channel, based on the Token sent from the CI 630; and send the RO to the User Equipment 610.

In a particular implementation according to the embodiment, the encrypted communication channel is established using IPSec. In this case, the stream media server 620 and the User Equipment 610 include an IPSec driver 621 and an IPSec driver 614 respectively. The IPSec driver 614 is adapted to establish an encrypted communication channel with the IPSec driver 621 of the stream media server 620 using the information for establishing the encrypted communication channel, when invoked by the DRM Agent 612.

Figure 7:
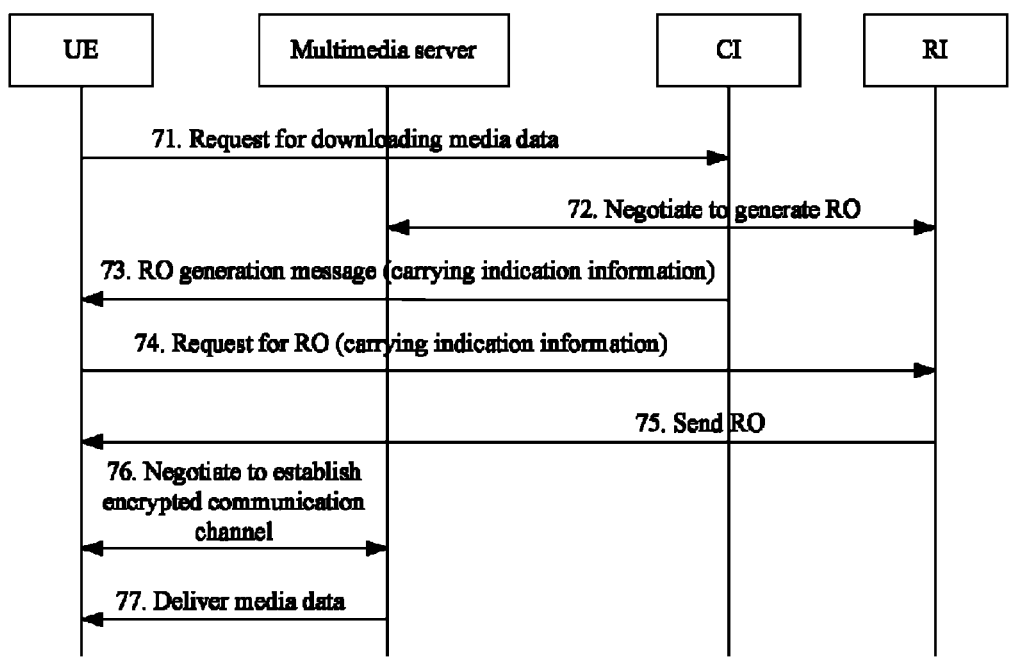
FIG. 7 is a flowchart of the digital copyright protection method according to a second embodiment.

With reference to FIG. 7, a flowchart of the digital copyright protection method according to the second embodiment is shown, and the method includes as follows.

At 71: A User Equipment requests for downloading media data from a Content Issuer;

At 72: Upon receipt of the request, the Content Issuer instructs a multimedia server and a Rights Issuer to generate an RO through negotiation;

At 72, the RO generated by the multimedia server and the RI through negotiation carries the information for establishing an encrypted communication channel between the User Equipment and the multimedia server.

At 73: After the RO is generated, the Content Issuer sends to the User Equipment a message carrying indication information, such as a RUL, corresponding to the RO.

At 74: The User Equipment requests for the RO from the Rights Issuer, with the indication information being carried in the request.

At 75: The Rights Issuer sends the RO to the User Equipment;

At 76: The User Equipment and the multimedia server establish the encrypted communication channel through negotiation using the information for establishing the encrypted communication channel carried in the RO; and At 77: The multimedia server transfers media data to the User Equipment via the encrypted communication channel.

The User Equipment processes the media data according to the copyright use rule in the RO. If the media data is a media stream, the process particularly may be to play the media stream. In other words, a stream media player is merely an illustrative implementation of a media data processor.

In the foregoing second embodiment, the Content Issuer notifies the User Equipment of the message that the RO is generated, and the User Equipment requests to obtain the RO from the Rights Issuer. There exists other way to allow the User Equipment to obtain the RO, for example, the Content Issuer may send the RO to the User Equipment on its initiative after the RO is generated.

Furthermore, the multimedia server may be a stream media server; or other type of multimedia server such as a server providing a mobile TV service or a file downloading service.

The IPSec may be used for the procedure of establishing the encrypted communication channel through negotiation at 76; further, other logical paths may be established, which will not be further described herein.

Figure 8:
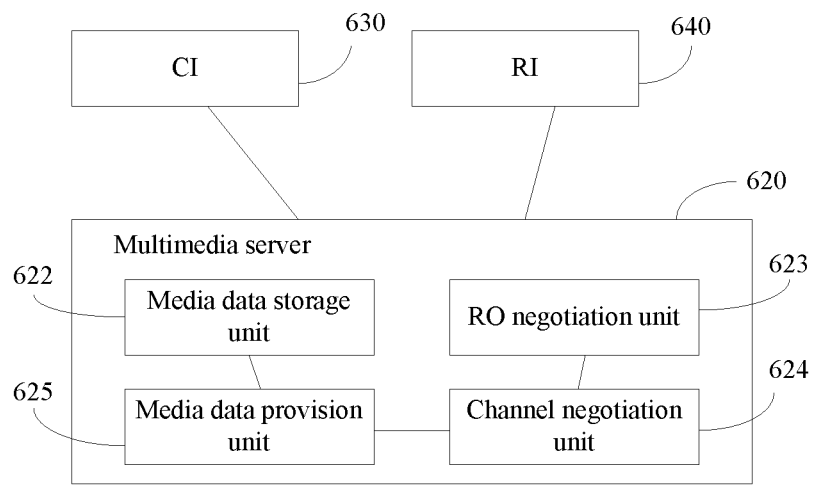
FIG. 8 is a block diagram of the digital copyright protection system according to the second embodiment.

With reference to FIG. 8, a block diagram of the digital copyright protection system according to the second embodiment is shown.

The digital copyright protection system includes a multimedia server 620, a Content Issuer 630 and a Rights Issuer 640.

The multimedia server 620 is adapted to store media data; negotiating with the Rights Issuer 640 to generate an RO carrying information for establishing an encrypted communication channel; negotiate with a User Equipment with the use of the information to establish the encrypted communication channel; and send media data under copyright protection to the User Equipment via the encrypted communication channel;

The Content Issuer 630 is adapted to provide the media information for the User Equipment; instruct the multimedia server 620 and the Rights Issuer 640 to negotiate to generate an RO carrying information for establishing the encrypted communication channel, when the User Equipment requests for downloading the media data; and send indication information corresponding to the RO to the User Equipment.

The Rights Issuer 640 is adapted to negotiate with the multimedia server 620 to generate the RO carrying information for establishing the encrypted communication channel according to the notification from the Content Issuer 630, and send the RO to the User Equipment according to the indication information from the user.

The multimedia server 620 may be a stream media server, or other media server providing other media service such as a mobile TV service and a file downloading service.

In an embodiment, the multimedia server 620 includes: a media data storage unit 622 adapted to store media data; an RO negotiation unit 623 adapted to negotiate with a Rights Issuer 640 to generate an RO carrying information for establishing an encrypted communication channel through; a channel negotiation unit 624 adapted to negotiate with a User Equipment using the information to establish the encrypted communication channel; and a media data provision unit 625 adapted to provide media data under copyright protection for the User Equipment via the encrypted communication channel.

The IPSec may be used by the multimedia server and the User Equipment to establish the encrypted communication channel, and the channel negotiation unit 624 may be an IPSec driver.

Various embodiments have been described above, but the scope of the disclosure is not limited to these. All variations or substitutions that readily occur to those skilled in the art without departing from the technical scope shall be encompassed within the scope of the disclosure. Accordingly, the scope of the disclosure shall be defined by the appended claims.

What is claimed is:

1. A stream media digital copyright protection method, comprising:

negotiating between a stream media server and a Rights Issuer to generate a Right Object that carries information for establishing an encrypted communication channel at the Internet Protocol Level between a User Equipment and the stream media server;

sending, by a Right Issuer, the Right Object to the User Equipment;

participating, by the stream media server, in establishing the encrypted communication channel with Internet Protocol Security (IPSec) at the Internet Protocol Level between the User Equipment and the stream media server using the information for establishing the encrypted communication channel carried in the Right Object; and sending, by the stream media server, a media stream to the User Equipment via the encrypted communication channel;

wherein the information for establishing the encrypted communication channel carried in the Right Object is authentication information for establishing IPSec communication between the User Equipment and the stream media server;

wherein the establishing the encrypted communication channel comprises negotiating between the User Equipment and the stream media server to establish a first phase of Security Association of IPSec and a second phase of Security Association of IPSec; and wherein, in establishing the first phase of Security Association of IPSec, the authentication information for establishing the IPSec communication carried in the Right Object is used for identity verification of the User Equipment and the stream media server.

2. The stream media digital copyright protection method according to claim 1, wherein the information for establishing the encrypted communication channel carried in the Right Object is copyright use acknowledge information.

3. The stream media digital copyright protection method according to claim 2, wherein the establishing the encrypted communication channel comprises:

authenticating, by the stream media server, the copyright use acknowledge information provided by the User Equipment; and negotiating between the stream media server and the User Equipment to establish the encrypted communication channel, after the authentication is passed.

4. A stream media digital copyright protection method, comprising:

negotiating between a stream media server and a Rights Issuer to generate a Right Object that carries information for establishing an encrypted communication channel at the Internet Protocol Level between a User Equipment and the stream media server;

sending, by a Right Issuer, the Right Object to the User Equipment;

participating, by the stream media server, in establishing the encrypted communication channel with Internet Protocol Security (IPSec) at the Internet Protocol Level between the User Equipment and the stream media server using the information for establishing the encrypted communication channel carried in the Right Object; and sending, by the stream media server, a media stream to the User Equipment via the encrypted communication channel;

wherein the encrypted communication channel established is in a tunneling mode or a transport mode.

5. The stream media digital copyright protection method according to claim 4, wherein the information for establishing the encrypted communication channel carried in the Right Object is authentication information for establishing IPSec communication between the User Equipment and the stream media server.

6. The stream media digital copyright protection method according to claim 5, wherein the establishing the encrypted communication channel comprises:

negotiating between the User Equipment and the stream media server to establish a first phase of Security Association of IPSec and a second phase of Security Association of IPSec;

wherein, in establishing the first phase of Security Association of IPSec, the authentication information for establishing the IPSec communication carried in the Right Object is used for identity verification of the User Equipment and the stream media server.

7. A digital copyright protection method, comprising:

negotiating between a multimedia server and a Rights Issuer to generate a Right Object, which carries information for establishing an encrypted communication channel at the Internet Protocol Level between a User Equipment and the multimedia server;

sending, by a Right Issuer, the Right Object to the User Equipment, participating, by the multimedia server, in establishing the encrypted communication channel with Internet Protocol Security at the Internet Protocol Level between the User Equipment and the multimedia server using the information for establishing the encrypted communication channel carried in the Rights Object; and sending, by the multimedia server, media data to the User Equipment via the encrypted communication channel;

wherein the encrypted communication channel established is in a tunneling mode or a transport mode.

8. The digital copyright protection method according to claim 7, wherein the information for establishing the encrypted communication channel carried in the Right Object is authentication information for establishing IPSec communication between the User Equipment and the multimedia server.

9. The digital copyright protection method according to claim 8, wherein the establishing the encrypted communication channel comprises:

negotiating between the User Equipment and the multimedia server to establish a first phase of Security Association of IPSec and a second phase of Security Association of IPSec;

wherein, in establishing the first phase of Security Association of IPSec, the authentication information for establishing the IPSec communication carried in the Right Object is used for identity verification of the User Equipment and the multimedia server.

10. The digital copyright protection method according to claim 7, wherein the information for establishing the encrypted communication channel carried in the Right Object is copyright use acknowledge information.

11. The digital copyright protection method according to claim 10, wherein the establishing the encrypted communication channel comprises:

authenticating, by the multimedia server, the copyright use acknowledge information provided by the User Equipment; and negotiating between the multimedia server and the User Equipment to establish the encrypted communication channel, after the authentication is passed.

12. A digital copyright protection system, comprising a multimedia server and a Right s Issuer, wherein:

the multimedia server is adapted to store media data; negotiate with the Rights Issuer to generate a Right Object, which carries information for establishing an encrypted communication channel at the Internet Protocol Level between a User Equipment and the multimedia server; negotiate with the User Equipment using the information to establish the encrypted communication channel with Internet Protocol Security at the Internet Protocol Level; and send media data under copyright protection to the User Equipment via the encrypted communication channel;

the Rights Issuer is adapted to negotiate with the multimedia server to generate the Right Object, which carries information for establishing the encrypted communication channel, and send the Right Object to the User Equipment; and the encrypted communication channel established is in a tunneling mode or a transport mode.

13. The digital copyright protection system according to claim 12, further comprising a Content Issuer for providing media information for the User Equipment, and instructing the multimedia server and the Rights Issuer to negotiate to generate the Right Object when the User Equipment requests for downloading the media data.

14. The digital copyright protection system according to claim 12, wherein the multimedia server is a stream media server.

15. A digital copyright protection system, comprising a multimedia server, a Rights Issuer and a Content Issuer, wherein:

the multimedia server is adapted to store media data; negotiate with the Rights Issuer to generate a Right Object, which carries information for establishing an encrypted communication channel at the Internet Protocol Level between a User Equipment and the multimedia server; negotiate with the User Equipment using the information to establish the encrypted communication channel with Internet Protocol Security at the Internet Protocol Level; and send media data under copyright protection to the User Equipment via the encrypted communication channel;

the Rights Issuer is adapted to negotiate with the multimedia server to generate the Right Object, which carries the information for establishing the encrypted communication channel according to the notification from the Content Issuer, and send the RO to the User Equipment according to the indication information from the User Equipment;

the Content Issuer is adapted to provide media information for the User Equipment; instruct the multimedia server and the Rights Issuer to negotiate to generate the Right Object, when the User Equipment requests for downloading the media data; and send indication information corresponding to the Right Object to the User Equipment; and the encrypted communication channel established is in a tunneling mode or a transport mode.

16. The digital copyright protection system according to claim 15, wherein the multimedia server is a stream media server.

17. A multimedia server, comprising:

a media data storage unit adapted to store media data;

a Right Object negotiation unit adapted to negotiate with a Rights Issuer to generate a Right Object, which carries information for establishing an encrypted communication channel at the Internet Protocol Level between a User Equipment and the multimedia server;

a channel negotiation unit adapted to negotiate with the User Equipment using the information to establish the encrypted communication channel with Internet Protocol Security at the Internet Protocol Level, wherein the encrypted communication channel established is in a tunneling mode or a transport mode; and a media data provision unit adapted to provide the media data under copyright protection to the User Equipment via the encrypted communication channel.

18. The multimedia server according to claim 17, wherein the channel negotiation unit is an IPSec driver.

* * * * *